United States Patent [19]
Thornton, Jr.

[11] 3,877,797
[45] Apr. 15, 1975

[54] OPTICAL FILTER COMBINATION FOR IMPROVING COLOR DISCRIMINATION

[75] Inventor: William A. Thornton, Jr., Cranford, N.J.

[73] Assignee: Westinghouse Electric Corporation, Pittsburgh, Pa.

[22] Filed: Oct. 23, 1973

[21] Appl. No.: 408,961

[52] U.S. Cl. ............... 351/44; 350/313; 350/316; 351/163
[51] Int. Cl. ..................... G02c 7/10; G02b 5/22
[58] Field of Search ........ 351/44, 35, 163; 350/313, 350/316

[56] References Cited
UNITED STATES PATENTS

| | | | |
|---|---|---|---|
| 1,222,049 | 4/1917 | Tillyer | 351/44 X |
| 3,013,114 | 12/1961 | Bridges | 350/316 X |

*Primary Examiner*—Paul A. Sacher
*Attorney, Agent, or Firm*—W. D. Palmer

[57] ABSTRACT

Optical filter combination removes two selected bands of light in order to improve the observed color discrimination between different colored objects. One of the filtered bands includes radiations of a wavelength of 580 nm and the other of the filtered bands includes radiations of a wavelength of 490 nm. Each of the filtered bands is preferably from 5 nm to 55 nm wide although the bands can be widened to 80 nm if desired.

4 Claims, 8 Drawing Figures

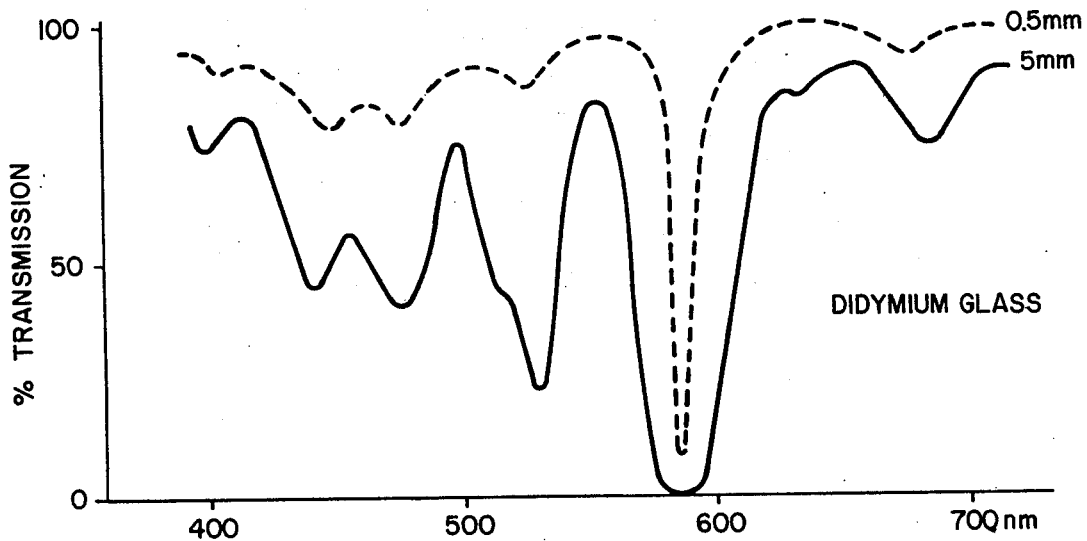
FIG.5 DIDYMIUM GLASS
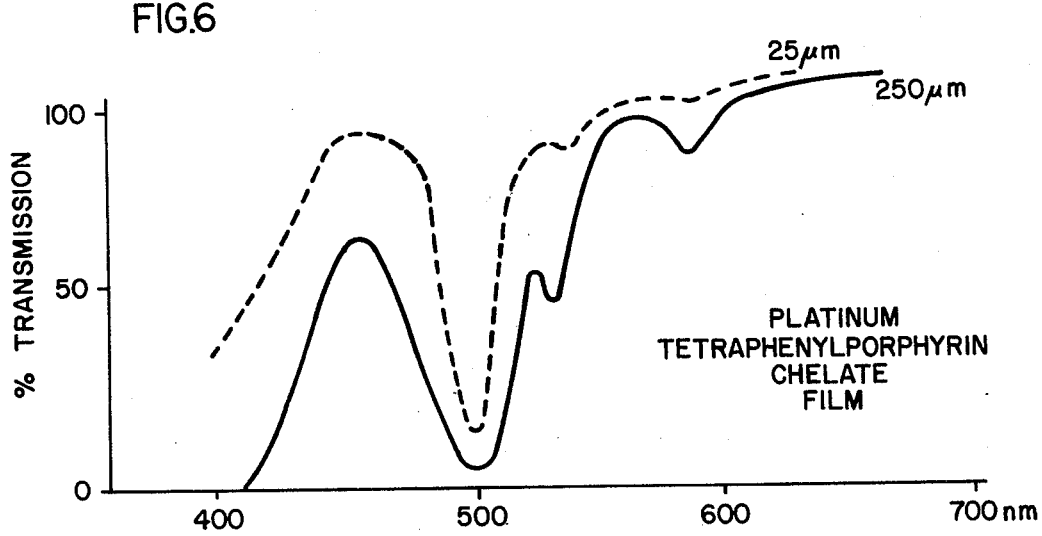
FIG.6 PLATINUM TETRAPHENYLPORPHYRIN CHELATE FILM

OPTICAL FILTER COMBINATION FOR IMPROVING COLOR DISCRIMINATION

BACKGROUND OF THE INVENTION

This invention relates to optical filters and, more particularly, to optical filters which will improve the color discrimination between different colored objects.

The generally accepted method for measuring the color rendering properties of light sources is set forth by the IES Subcommittee on Color Rendering, see Illuminating Engineering, Volume 57, July, 1962, page 471; CIE Committee E-1.3.2, CIE Publication No. 13, First Edition, 1965, Central Bureau of the Commission Internationale de l'Eclairage, Paris. In accordance with this method which provides a color rendering index (CRI), there is provided a measure of how similarly a test illuminant renders the colors of a set of eight test objects to the colors of the same objects under a natural reference illuminant (daylight or incandescence) of source color very similar to that of the test illuminant.

Another concept which is involved in measuring color is the so-called color discrimination index (CDI), which index is a measure of the average perceived color difference between any of the colors of the same eight test objects as rendered by the test illuminant. This index is proportional to the area in the 1960 CIE U, V color diagram of the gamut of chromaticities of the eight test objects as rendered by the test illuminant. In this instance, no account is taken of whether the object colors are rendered naturally or otherwise and no reference illuminant is involved.

As another concept, color preference index (CPI) is a measure of how similarly a test illuminant renders the colors of the same eight test objects to their preferred colors. The foregoing basic concepts are explained in detail in Lighting Design and Application, December 1972, pages 51 and 52, article by W. A. Thornton, the inventor herein.

In Journal of the Optical Society of America, Volume 61, No. 9, pages 1155–1163, September 1971, article entitled "Luminosity and Color-Rendering Capability of White Light," by W. A. Thornton, it is shown that to maximize luminous efficiency and the color-rendering index, there should be combined three spectral lines near 450 nm, 540 nm, and 610 nm, and it is also shown that the wavelength regions near 500 nm and 580 nm are disadvantageous with respect to providing good color rendition.

In Journal of the Optical Society of America, Volume 62, No. 3, March 1972, article entitled "Three-Color Visual Response" by W. A. Thornton, it is described that various experiments indicate that three-color response of human vision consists of well-separated channels peaking near 450 nm, 540 nm and 610 nm.

The color discrimination index (CDI) referred to hereinbefore is described in greater detail in Journal of the Optical Society of America, Volume 62, No. 2, pages 191–194, February 1972, article entitled "Color-Discrimination Index" by W. A. Thornton.

The foregoing scientific articles all primarily deal with artificial light sources and the illumination of colored objects by such light sources. In accordance with the present invention, the color discrimination between different colored objects is improved by a color-subtractive technique or filtering system.

SUMMARY OF THE INVENTION

There is provided an optical filter combination which, when interposed in a light path to alter at least one of (a) the illuminating radiations generated by a light source and (b) the object-reflected radiations ultimately received by the viewer's eye, will enhance the color discrimination which is observed between objects of different colors. The filter comprises two essential filtering means, one of which removes from the light path a selected band of radiations which includes 580 nm radiations. The other of the essential filtering means removes from the light path a selected band of radiations which includes 490 nm radiations. The bandwidth of the radiations removed by each of the essential filtering means is from 5 nm to 80 nm and preferably from 5 nm to 55 nm.

BRIEF DESCRIPTION OF THE DRAWINGS

For a better understanding of the invention, reference may be had to the preferred embodiment, exemplary of the invention, as shown in the accompanying drawings, in which:

FIG. 5 is a graph of percent transmission versus wavelength for various thicknesses of didymium glass;

FIG. 6 is a graph of percent transmission versus wavelength for different thicknesses of platinum tetraphenylporphyrin chelate film;

DESCRIPTION OF THE PREFERRED EMBODIMENTS

Figure 1:
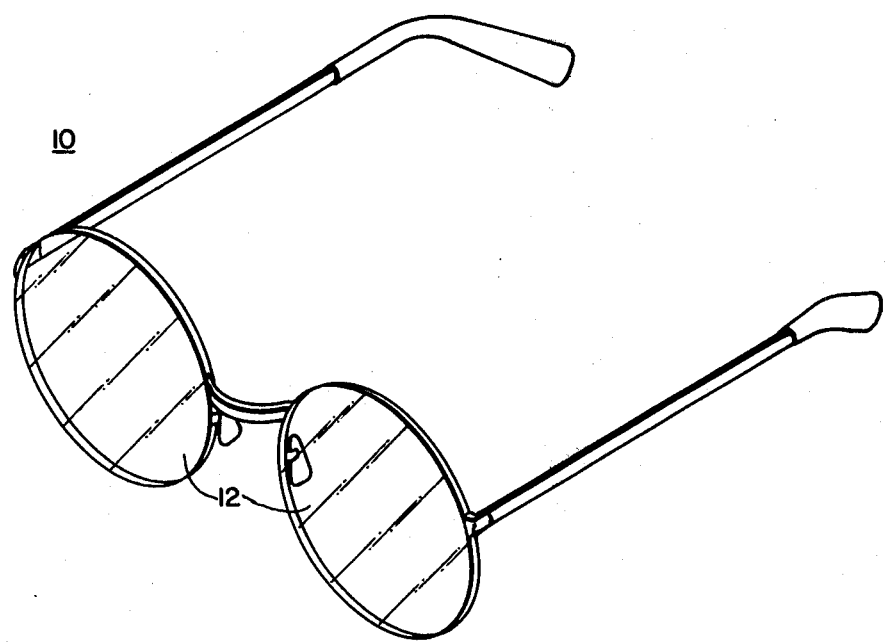
FIG. 1 is an isometric view of a pair of spectacles modified to incorporate the present optical filters.
Figure 2:
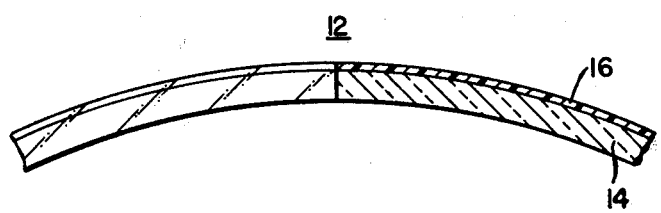
FIG. 2 is an enlarged elevational fragmentary view, shown partly in cross section, of one of the lens members of the spectacles shown in FIG. 1.

The spectacles 10 as shown in FIG. 1 are generally conventional except that the lens members 12 are modified to incorporate the present optical filter combination. This optical filter combination is shown in enlarged, cross-sectional, fragmentary view in FIG. 2 and preferably comprises a base of didymium glass 14 having an overlaying chelate film 16 as will be described hereinafter.

Figure 3:
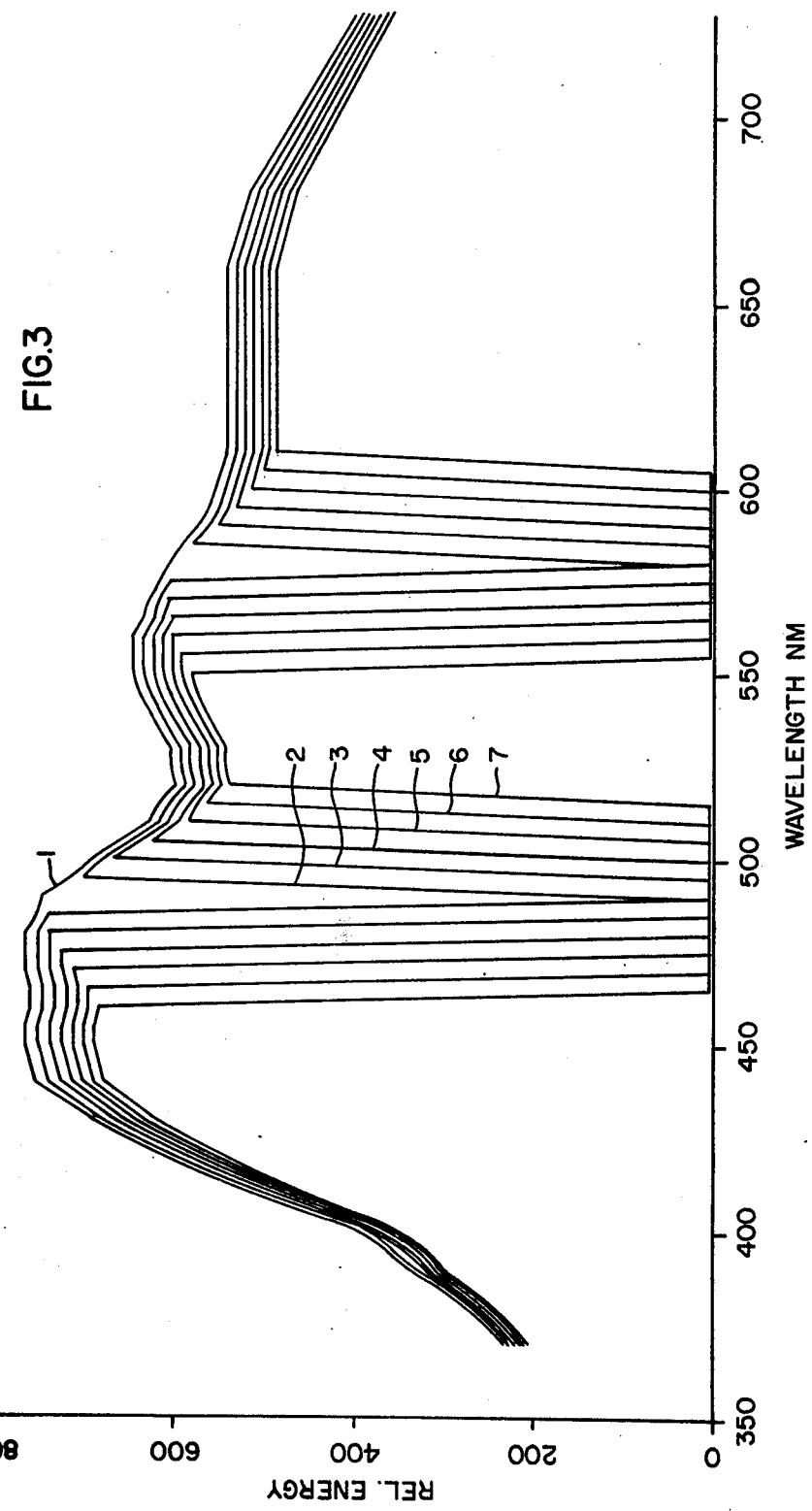
FIG. 3 is a graph of relative energy versus wavelength showing how increasingly wide selected bands of radiations can be subtracted from daylight in order to provide a modified filtered light.

In FIG. 3 is shown the spectrum of daylight wherein relative energy is plotted versus wavelength, and wherein the uppermost line designated (1) illustrates the unaltered and unfiltered daylight spectrum. The next lower line designated (2) in the same spectrum, but with radiation slices of the spectrum centered at 490 nm and 580 nm, which have an average bandwidth of 5 nm, removed therefrom. The next lower line designated (3) shows the effect of removing from the daylight spectrum radiation slices which have a bandwidth of 15 nm. The lines designated (4), (5), (6) and (7), respectively correspond to the results obtained when removed radiation slices have bandwidths of 25 nm, 35 nm, 45 nm, and 55 nm removed from daylight. The actual spectral data obtained therefrom are shown in the following Table I:

imately 25 microns, it will remove a slice of radiations having a width of approximately 15 nm centered at about 490 nm. If the film has a thickness of about 75 microns, there will be removed a slice of radiations having a width of about 35 nm and if the film has a thickness of about 300 microns, there will be removed from the daylight a radiation slice having a width of about 55 nm. The thickness of the chelate film can vary from about 8 microns to about 300 microns.

In the preferred embodiment as shown, the chelate film is carried directly on the didymium glass, but other added filter layers could be utilized if desired. The resulting light will still appear generally white to the eye

TABLE I

|  | Color Discrimination Index (Gamut Area) | Color Preference Index | Brightness Per Watt | Lumens Per Watt | Color Rendering Index |
| --- | --- | --- | --- | --- | --- |
| Daylight | 100 | 100 | 100 | 100 | 100 |
| Daylight minus 5 nm slices | 106 | 106 | 101 | 98 | 96 |
| Daylight minus 15 nm slices | 117 | 114 | 103 | 94 | 86 |
| Daylight minus 25 nm slices | 131 | 118 | 105 | 88 | 74 |
| Daylight minus 35 nm slices | 146 | 112 | 106 | 82 | 63 |
| Daylight minus 45 nm slices | 164 | 98 | 105 | 75 | 50 |
| Daylight minus 55 nm slices | 184 | 80 | 103 | 66 | 37 |

Figure 4:
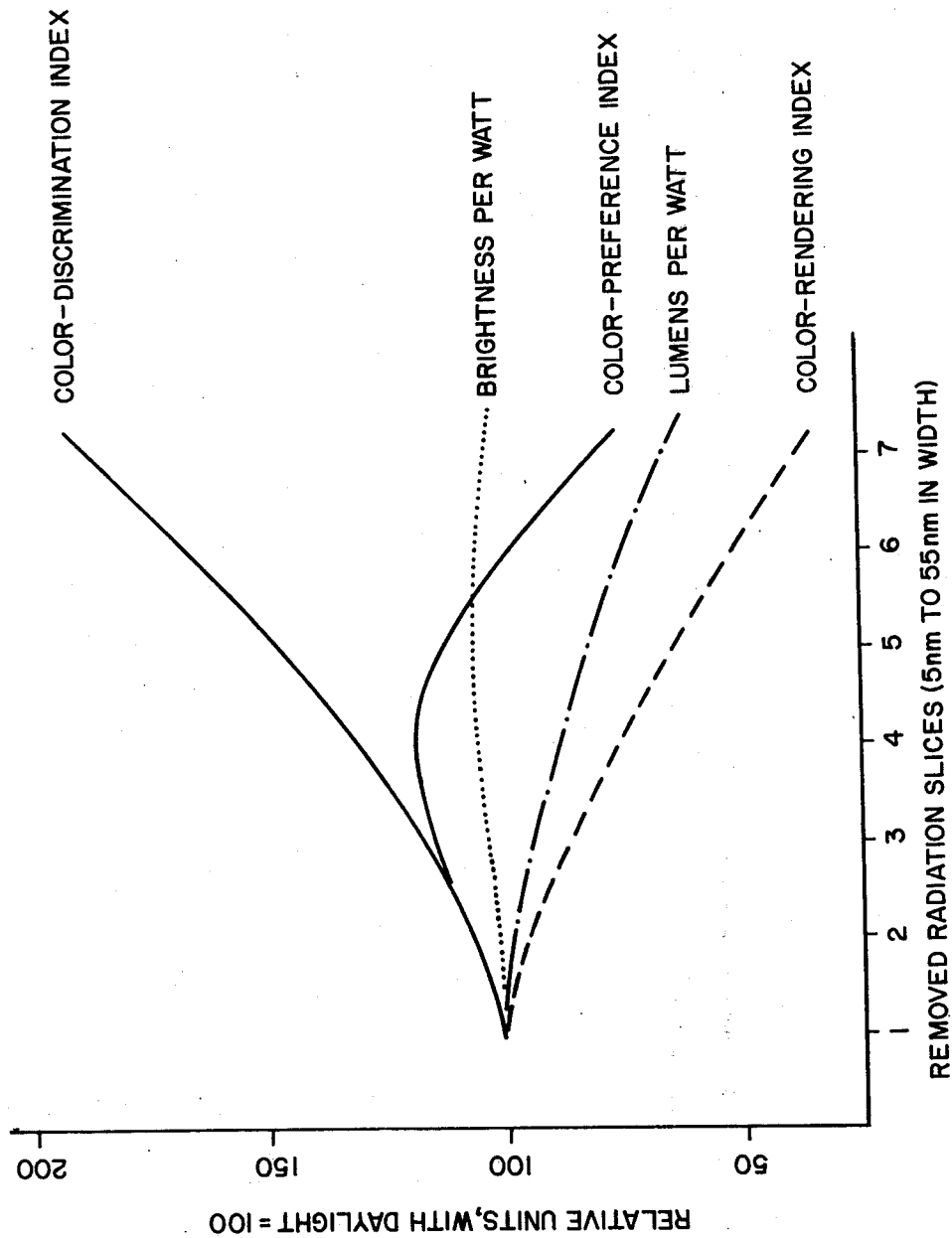
FIG. 4 is a graph of performance in relative units versus width of wavelength band subtracted showing the resulting change in color-discrimination index and other light measuring indices when the bands as indicated in FIG. 3 are subtracted from daylight.

The results as shown in Table I are plotted as FIG. 4 and as shown thereon, when 55 nm slices of radiations are removed from daylight, with the slices centered at 490 nm and 580 nm respectively, the color discrimination index for different colored objects is increased by 84 percent. By wearing goggles of the appropriate filter material, the observer can more easily distinguish between different colored objects. This has application for industrial work where color sorting is a paramount consideration.

The foregoing filter can be readily prepared as a composite member by forming the spectacle lenses 12 of didymium glass 14 with the indicated chelate film 16 thereover. In FIG. 5 is shown the transmission versus wavelength characteristics for didymium glass members of a thickness of 0.5 mm and 5 mm, respectively shown as dashed and solid lines. In order to achieve the desired absorption characteristics for the present invention, the didymium glass should have a thickness of from about 0.5 mm to about 6 mm. As a specific example, if the didymium glass has a thickness of about 1.5 mm, it will remove approximately a 15 nm slice of radiations centered at about 580 nm. If the thickness of the didymium glass is about 4 mm, the removed slice of radiations will have a width of about 35 nm, and if the thickness of the didymium glass is 6 mm, the width of the removed radiation slice will be 55 nm. Didymium glass is a commercial material which has been marketed for many years by the Corning Glass Works, Corning, New York.

The shorter wavelength radiation slices are removed by utilizing a film of platinum tetraphenylporphyrin chelate and the radiation transmission characteristics versus wavelength for such film of varying thickness is shown in FIG. 6. The dashed line as shown in this figure represents the transmission characteristics for a film having a thickness of 25 microns and the solid line as shown in FIG. 6 shows the transmission characteristics of such film which has a thickness of 250 microns. As a specific example, if the film has a thickness of approxwith a brightness somewhat attenuated due to the filtering action. The primary effect of the filter will be to increase the color discrimination observable between different colored objects, as shown in Table I and in FIG. 4. Of course, with the proper selection of material, the spectacle lenses 12 could be made homogeneous rather than composite, provided the indicated radiation bands were absorbed.

While the most apparent application for the foregoing filter is for spectacles, it can be interposed in a light path to alter the illuminating radiations generated by a light source before the radiations ever strike the object being illuminated. For example, the filter could be placed upon or used as a window pane or as diffusers for artificial light sources so that the color discrimination between different colored objects would be enhanced without the necessity for the viewer to wear the filter spectacles. The filter could also be used as, or placed upon, the bulb portion of a lamp, such as an incandescent lamp. In both cases of course, the object-reflected radiations received by the viewer's eye would be modified. Alternatively, one of the filter members, such as the chelate film, could be placed upon a window and the filter spectacles simply formed of didymium glass, so that the ultimate received radiations would have removed therefrom the 490 nm and 580 nm radiations.

Figure 8:
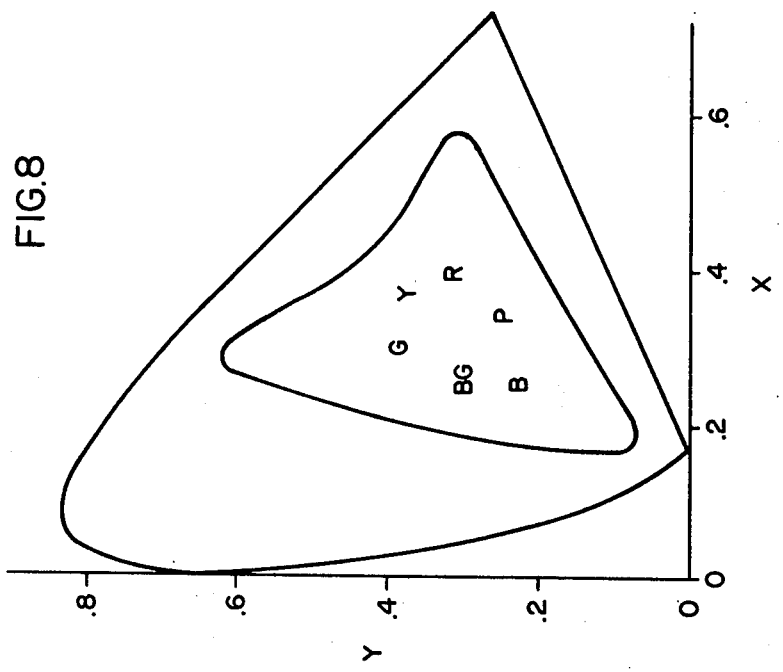
FIG. 8 illustrates the x,y-chromaticity diagram of the ICI system and shown thereon are the different colors for the filtered daylight as shown in FIG. 7, with the total gamut of obtainable colors shown as a triangle-appearing outline encompassing the indicated colors as shown.
Figure 7:
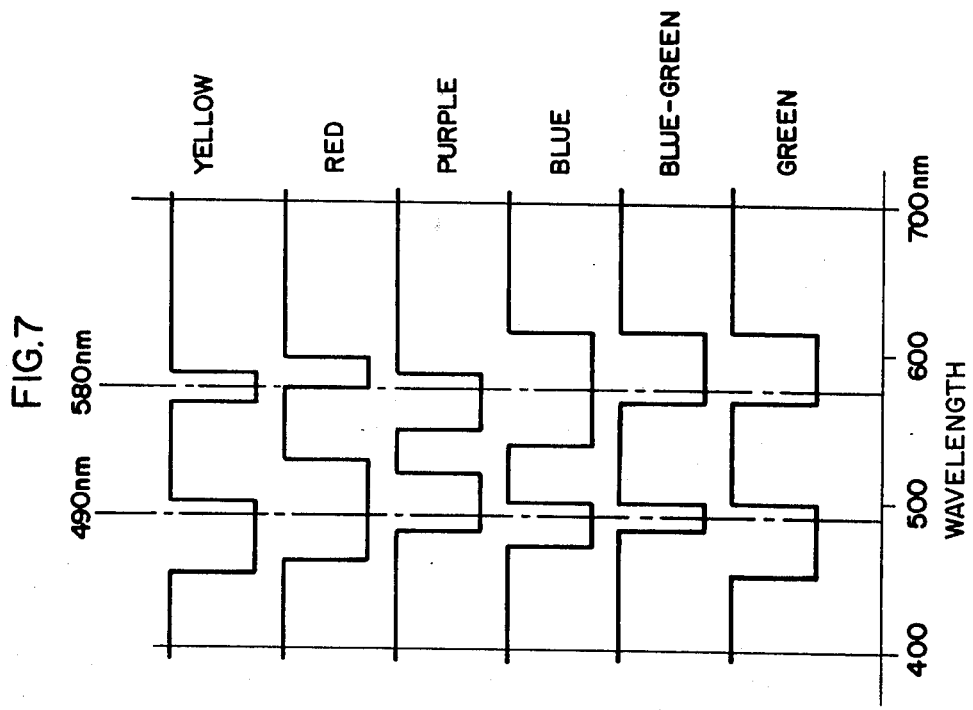
FIG. 7 illustrates different apparent overall colors which may be achieved from filter systems by removing selected bands of radiations from daylight, while simultaneously improving the color discrimination between observed objects of different colors.

As noted, the foregoing specific filter examples will generally produce a white-appearing light and the primary effect of the filter will be to enhance the color discrimination between viewed objects of different colors. It is also possible to provide the composite filter with such characteristics that the overall light will have the appearance of different colors and the color discrimination between viewed objects will also be enhanced. Slices of radiations taken from the daylight spectrum, along with the resulting colored appearance thereof, are shown in FIG. 7. The widest of these removed slices is 80 nm which is removed in order to produce the blue filter coloration. In all cases, the removed slices of radiations include both the 490 nm line and the 580 nm line. As shown, the colors are yellow, red, purple, blue, blue-green and green. To produce the yellow appearance, a 50 nm slice is removed from the shorter wavelengths and a 20 nm slice is removed from the longer wavelengths. To produce the red-colored appearance, a 70 nm slice is removed from the shorter wavelengths and a 20 nm slice from the longer wavelengths. To produce the purple appearance, 40 wide slices of radiations are removed from both the shorter and longer wavelengths. To produce the blue radiations, a 30 nm slice is removed from the shorter wavelengths and an 80 nm slice is removed from the longer wavelengths. To produce the blue-green radiations, a 20 nm slice is removed from the shorter wavelengths and a 50 nm slice is removed from the longer wavelengths. To produce the green-colored appearance, 50 nm slices are removed from both the shorter wavelengths and the longer wavelengths. The relative positioning of the removed slices with respect to the 490 nm and 580 nm lines are shown in FIG. 7. The actual colored appearance of the resulting filter is shown in the ICI diagram of FIG. 8, wherein each of the colors designated by the appropriate capital letter is superimposed on the ICI diagram. The inner "solid line" triangle represents the reasonable extremes of colors which can be obtained by removing selected slices of radiations, while still improving the color discrimination between colored objects for light which passes the filters.

Fabricating unitary filters which will remove a variety of predetermined slices of radiations from a light source, such as daylight, can be very difficult. The removal of predetermined, different slices of radiations from a light beam path can readily be achieved, however, by a combination of so-called dichroic or color-separating interference filters placed in series in the beam path of the illuminating light. As an example, each of two filters can be used as a mirror to pass an unwanted band or slice of radiations, with the remaining radiations being reflected. Thus, by selection of the filter mirrors to pass those bands of radiations which are unwanted, the objects to be illuminated will be lighted with the desired, reflected radiations, which can be of any predetermined hue, see FIG. 7, and the color discrimination observable between different colored objects will also be greatly enhanced. A general description of such interference filters can be found in a brochure of Bausch & Lomb Inc., Rochester 2, N.Y., identified as E 306 0763, entitled Bausch & Lomb Multi-Films, see pages 17–21 thereof.

What I claim is:

1. An optical filter combination which, when interposed in a light path of illuminating radiations to alter at least one of (a) the illuminating radiations generated by a light source and (b) the object-reflected radiations ultimately received by the viewer's eye, will enhance the color discrimination which is observed between objects of different colors, said filter consisting of two essential filtering means, one of said essential filtering means removing from the light path a selected band of radiations which includes 580 nm radiations, and the other of said essential filtering means removing from the light path a selected band of radiations which includes 490 nm radiations and the bandwidth of the radiations removed by each of said essential filtering means being from 5 nm to 80 nm.

2. An optical filter combination which, when interposed between at least one of (a) viewed illuminated objects of different colors and the viewer, and (b) viewed illuminated objects of different colors and the light source which illuminates such objects, will enhance the apparent color discrimination between the viewed illuminated objects, said filter consisting of two essential filtering means, one of said essential filtering means absorbing a selected band of radiations centered at about 580 nm, and the other of said essential filtering means absorbing a selected band of radiations centered at about 490 nm, and the bandwidth of radiations absorbed by each of said essential filtering means being from 5 nm to 55 nm.

3. The optical filter combination as specified in claim 2, wherein said one filter means comprises didymium galss having a thickness of from about 0.5 mm to about 6 mm, and said other filter means comprises platinum tetraphenylporphyrin chelate film carried on said glass and having a thickness of from about 8 microns to about 300 microns.

4. The optical filter combination as specified in claim 3, wherein said filter combination is conformed as lens means to be fitted to the eyes of the observer.

* * * * *